United States Patent
Cho et al.

(10) Patent No.: US 10,471,470 B2
(45) Date of Patent: Nov. 12, 2019

(54) COVER WINDOW AND METHOD OF MANUFACTURING THE SAME

(71) Applicant: SAMSUNG DISPLAY CO., LTD., Yongin-si, Gyeonggi-Do (KR)

(72) Inventors: Hyun-Il Cho, Hwaseong-si (KR); Hyun Seok Ko, Gwangju (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 195 days.

(21) Appl. No.: 15/438,019

(22) Filed: Feb. 21, 2017

(65) Prior Publication Data

US 2018/0001347 A1    Jan. 4, 2018

(30) Foreign Application Priority Data

Jun. 29, 2016  (KR) .................. 10-2016-0081556

(51) Int. Cl.
| | |
|---|---|
| *B32B 3/10* | (2006.01) |
| *B05D 7/00* | (2006.01) |
| *B05D 3/06* | (2006.01) |

(52) U.S. Cl.
CPC .............. *B05D 7/50* (2013.01); *B05D 3/06* (2013.01)

(58) Field of Classification Search
None
See application file for complete search history.

(56) References Cited

U.S. PATENT DOCUMENTS

| | | |
|---|---|---|
| 6,521,862 B1 | 2/2003 | Brannon |
| 2003/0019897 A1 | 1/2003 | Chuang et al. |
| 2010/0279067 A1* | 11/2010 | Sabia .............. C03B 17/064 428/141 |
| 2013/0292396 A1 | 11/2013 | Dinh et al. |
| 2015/0110991 A1* | 4/2015 | Miwa ............... C03B 33/076 428/77 |

FOREIGN PATENT DOCUMENTS

| | | |
|---|---|---|
| EP | 2604584 | 6/2013 |
| JP | 2010-189201 | 9/2010 |
| JP | 5255894 | 4/2013 |
| KR | 10-2014-0021823 | 2/2014 |
| WO | 2016033253 | 3/2016 |

OTHER PUBLICATIONS

European Search Report dated Aug. 24, 2017 in corresponding European Application No. 17167919.4 ((9 pages).

* cited by examiner

*Primary Examiner* — Christopher M Polley
(74) *Attorney, Agent, or Firm* — F. Chau & Associates, LLC

(57) ABSTRACT

A cover window includes a plastic layer and a first hard coating layer disposed on an upper surface of the plastic layer. An edge of the cover window includes a vertical side part perpendicular to the upper surface of the plastic layer. A first inclination part is connected to the vertical side part and is inclined with respect to the vertical side part. The vertical side part and the first inclination part include a mechanical processing trace. An edge of the first hard coating layer adjacent to the first inclination part includes a laser processing trace.

12 Claims, 17 Drawing Sheets

COVER WINDOW AND METHOD OF MANUFACTURING THE SAME

CROSS-REFERENCE TO RELATED APPLICATION

This application claims priority under 35 U.S.C. § 119 to Korean Patent Application No. 10-2016-0081556 filed in the Korean Intellectual Property Office on Jun. 29, 2016, the disclosure which is incorporated by reference herein in its entirety.

1. Technical Field

Exemplary embodiments of the present invention relate to a cover window, and more particularly to a method of manufacturing the same.

2. Discussion of Related Art

A display device may include a display panel including a plurality of pixels displaying an image, and a transparent cover window covering a display side of the display panel. The cover window may protect the display panel from external impact and scratches generated in use of the cover window. The display window may include glass or plastic. As an example, when the cover window includes plastic, a hard costing layer may be formed on a surface of the plastic, which may protect a surface of the display panel, and may increase strength of the cover window.

The cover window may have a desired shape. The shape of the cover window may correspond with a shape of a display panel of a mobile phone. As an example, the cover window may be processed by a mechanical processing method using computer numerical control (CNC) process machinery.

When processing the cover window including the hard coating layer by the mechanical processing method, an edge of the hard coating layer may have a relatively rough shape. When bending the cover window in this state, a crack may be generated from the edge of the hard coating layer. If the crack is generated in the hard coating layer, the crack may create a visual defect, and the plastic may be broken as the crack grows by a following process or use.

SUMMARY

One or more exemplary embodiments of the present invention provide a cover window that is relatively strong against bending and impact, and a manufacturing method for the cover window.

A cover window according to an exemplary embodiment of the present invention includes a plastic layer and a first coating layer disposed on an upper surface of the plastic layer. An edge of the cover window includes a vertical side part perpendicular to the upper surface of the plastic layer. A first inclination part is connected to the vertical side part and is inclined with respect to the vertical side part. The vertical side part and the first inclination part include a mechanical processing trace. An edge of the first coating layer adjacent to the first inclination part includes a laser processing trace.

The edge of the cover window may include a first horizontal part connected to the first inclination part, and a second inclination part connected to the first horizontal part.

The first horizontal part and the second inclination part may include the laser processing trace.

The vertical side part, the first inclination part, the first horizontal part, and a first part of the second inclination part may be positioned at an edge of the plastic layer. A second part of the second inclination part may be positioned at an edge of the first coating layer.

The second inclination part may include the laser processing trace.

The vertical side part, the first inclination part, and the first horizontal part may be positioned at the edge of the plastic layer. The second inclination part may be positioned at an edge of the first coating layer.

A second coating layer may be disposed on a lower surface of the plastic layer. The edge of the cover window may include a third inclination part connected to the vertical side part and inclined with respect to the vertical side part, a second horizontal part connected to the third inclination part, and a fourth inclination part connected to the second horizontal part. The first inclination part, the first horizontal part, and the second inclination part may be substantially symmetrical to the third inclination part, the second horizontal part, and the fourth inclination part, respectively.

The edge of the cover window may include a first groove adjacent to the first inclination part and positioned at an upper surface of the cover window. The first groove may include the laser processing trace.

A depth of the first groove may be larger than or equal to a thickness of the first coating layer.

A second coating layer may be disposed on a lower surface of the plastic layer. The edge of the cover window may include a second groove positioned at the lower surface of the cover window. The second groove may include the laser processing trace and may be substantially symmetrical to the first groove.

A manufacturing method of a cover window according to an exemplary embodiment of the present invention includes forming a first coating layer on an upper surface of a plastic layer. Mechanical processing is performed to an edge of the plastic layer and an edge of the first coating layer to form a mechanical processing trace. Laser processing is performed to the edge of the first coating layer after performing the mechanical processing.

An edge of the cover window may include a vertical side part perpendicular to the upper surface of the plastic layer. A first inclination part may be connected to the vertical side part and inclined with respect to the vertical side part. A first horizontal part may be connected to the first inclination part. A second inclination part may be connected to the first horizontal part. The vertical side part and the first inclination part may be formed by mechanical processing.

The first horizontal part and the second inclination part may be formed by laser processing.

The vertical side part, the first inclination part, the first horizontal part, and a first part of the second inclination part may be positioned at an edge of the plastic layer. A second part of the second inclination part may be positioned at an edge of the first coating layer.

A laser processing trace may remain at the edge of the first coating layer.

The second inclination part may be formed by the laser processing.

The vertical side part, the first inclination part, and the first horizontal part, and a first part of the second inclination part may be positioned at the edge of the plastic layer. A second part of the second inclination part may be positioned at an edge of the first coating layer.

The edge of the cover window may include a first groove adjacent to the first inclination part and positioned at an upper surface of the cover window. The first groove may be formed by laser processing.

A depth of the first groove may be larger than or equal to a thickness of the first coating layer.

The mechanical processing may be performed by using a computer numerical control processing machine. The laser processing may be performed by using a carbon dioxide gas laser.

A laser may be radiated to the first coating layer until the plastic layer is at least partially exposed.

When a thickness of the first coating layer is from 0 µm to about 5 µm, a power of the laser may be from about 2.5 W to about 3.5 W. When the thickness of the first coating layer is from about 5 µm to about 10 µm, the power of the laser may be from about 3.0 W to about 4.0 W. When the thickness of the first coating layer is from about 10 µm to about 15 µm, the power of the laser may be from about 3.5 W to about 4.5 W. When the thickness of the first coating layer is from about 15 µm to about 20 µm, the power of the laser may be from about 4.0 W to about 5.0 W. When the thickness of the first coating layer is from about 20 µm to about 25 µm, the power of the laser may be from about 4.5 W to about 5.5 W.

A second coating layer may be formed on a lower surface of the plastic layer. Mechanical processing may be performed on an edge of the second coating layer.

Laser processing may be performed to the edge of the second coating layer after performing the mechanical processing.

Shapes of the first coating layer and the second coating layer may be formed to be substantially symmetrical.

According to an exemplary embodiment, after performing the mechanical processing, the cover window may undergo laser processing such that a bending ability and an impact resistance of the cover window may be increased.

BRIEF DESCRIPTION OF THE DRAWINGS

The above and other features of the inventive concept will become more apparent by describing in detail exemplary embodiments thereof, with reference to the accompanying, in which.

DETAILED DESCRIPTION

Figure 1:
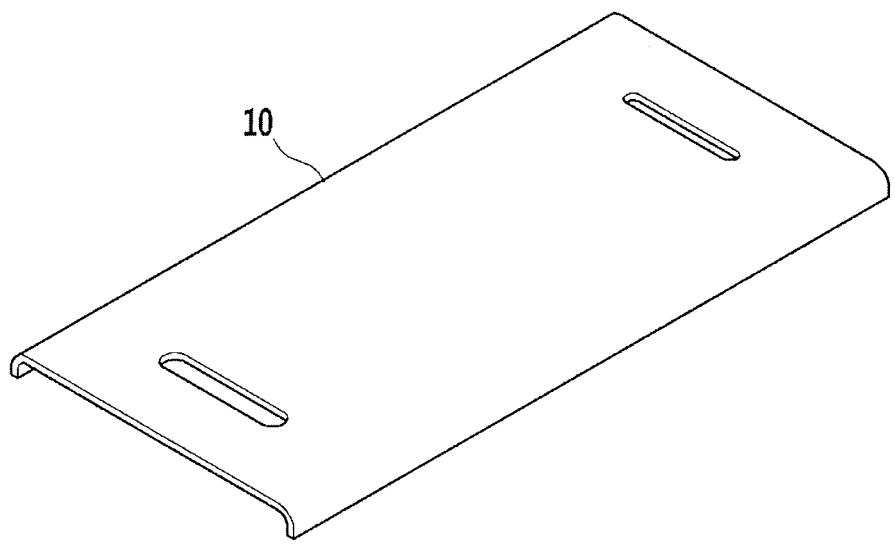
FIG. 1 is a perspective view of a cover window according to an exemplary embodiment of the present invention.

Exemplary embodiments of the present invention will be described in more detail below with reference to the accompanying drawings, in which exemplary embodiments of the preset invention are shown. As those skilled in the art would realize, the described embodiments may be modified in various different ways, all without departing from the spirit or scope of the present invention.

In the drawings, the thicknesses of layers, films, panels, or regions may be exaggerated for clarity. Like reference numerals may refer to like elements throughout the specification and drawings. It will be understood that when an element such as a layer, film, region, or substrate is referred to as being "on" another element, it may be directly on the other element or intervening elements may be present.

FIG. 1 is a perspective view of a cover window according to an exemplary embodiment of the present invention.

FIG. 1 illustrates substantially an entire shape of a cover window according to an exemplary embodiment of the present invention.

Referring to FIG. 1, a cover window 10 according to an exemplary embodiment of the present invention may have a bent shape.

The cover window 10 may be attached to a display panel and may protect the display panel from being damaged or broken by an external impact. The cover window 10 may be attached to the display panel by a predetermined adhesive layer. As an example, the display panel and the cover window 10 may be separated from each other via an air layer disposed between the display panel and the cover window 10. The display panel may include an organic light emitting panel, or a liquid crystal panel.

The shape of the cover window 10 may be changed depending on the shape of the display panel, and a curvature of a bent portion of the cover window 10 may be changed depending on the curvature of the display panel. Referring to FIG. 1, opposite edges of the cover window 10 have the bent shape, however exemplary embodiments of the present invention are not limited thereto, and the shape of the cover window may be changed, as desired.

A shape of the edge of the cover window according to an exemplary embodiment of the present invention will be described in more detail below with reference to FIG. 2 and FIG. 3.

Figure 2:
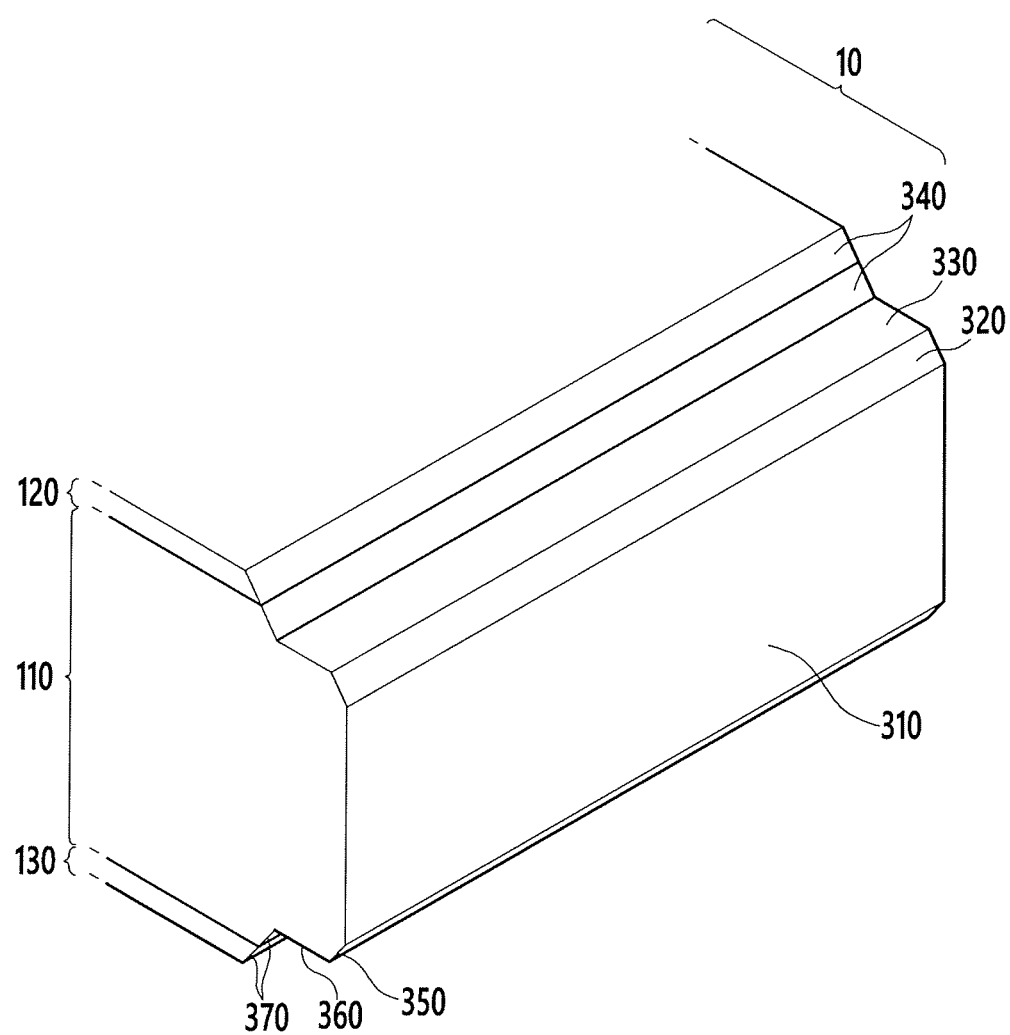
FIG. 2 is a partially cut-away perspective view of an edge of a cover window according to an exemplary embodiment of the present invention.

FIG. 2 is a partially cut-away perspective view of an edge of a cover window according to an exemplary embodiment of the present invention. FIG. 3 is a cross-sectional view of an edge of a cover window according to an exemplary embodiment of the present invention.

Figure 3:
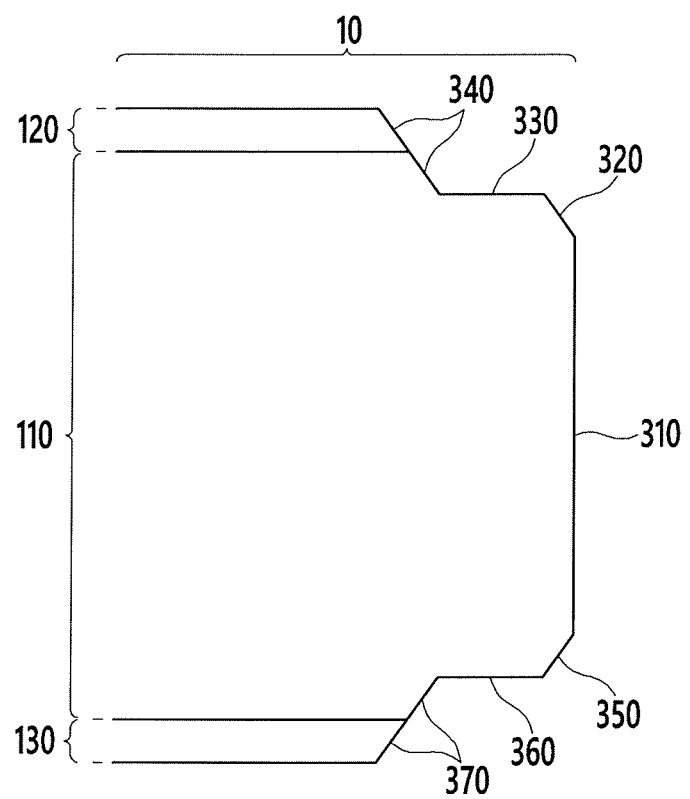
FIG. 3 is a cross-sectional view of an edge of a cover window according to an exemplary embodiment of the present invention.

Referring to FIG. 2 and FIG. 3, the cover window 10 may include a plastic layer 110 and a first hard coating layer 120 disposed on an upper surface of the plastic layer 110.

The plastic layer 110 may include a plastic material such as a PMMA (polymethylmethacrylate) series or polycarbonate series plastic. The plastic of the PMMA series may reduce or eliminate an occurrence of a yellowing phenomenon by a laser process.

The first hard coating layer 120 may have a single layer structure or a multilayer structure such as a dual layer, a triple layer, or a quadruple layer. The first hard coating layer 120 may include an organic material such as an ultraviolet ray hardening acrylate or an ultraviolet ray hardening epoxy. The first hard coating layer 120 may include an organic/inorganic mixture material, which may further include an inorganic material such as a nano-silica sol. The first hard coating layer 120 may have hardness of more than an HB pencil hardness.

The cover window may include a second hard coating layer 130 disposed on a lower surface of the plastic layer 110. The second hard coating layer 130 may have a single layer or a multilayer structure, such as a dual layer, a triple layer, or a quadruple layer. The second hard coating layer 130 may include an organic material or an organic/inorganic mixture material. The second hard coating layer 130 may have a hardness of more than an HB pencil hardness. The second hard coating layer 130 may include a same material as the first hard coating layer 120, and the first hard coating layer 120 and the second hard coating layer 130 may be substantially symmetrical.

The first hard coating layer 120 and the second hard coating layer 130 may each protect the plastic layer 110 and may each increase the hardness of the cover window 10.

An edge of the cover window 10 may include a vertical side part 310 positioned at a center of the plastic layer 110 in a thickness direction, and a first inclination part 320 connected to the vertical side part 310. The edge of the cover window 10 may include a first horizontal part 330 connected to the first inclination part 320 and a second inclination part 340 connected to the first horizontal part 330. The edge of the cover window 10 may include a third inclination part 350 connected to the vertical side part 310, a second horizontal part 360 connected to the third inclination part 350, and a fourth inclination part 370 connected to the second horizontal part 360.

The vertical side part 310 may have a surface that is substantially perpendicular to the upper surface and the lower surface of the plastic layer 110. In an exemplary embodiment of the present invention, the second hard coating layer 130, the third inclination part 350, the second horizontal part 360, and the fourth inclination part 370 may be omitted, and in this case, the vertical side part 310 may extend from the center of the plastic layer 110 in the thickness direction of the plastic layer 110 toward a lower end of the plastic layer 110. That is, the vertical side part 310 may be connected to the lower surface of the plastic layer 110.

The first inclination part 320 may connect the vertical side part 310 and the first horizontal part 330 and may be inclined with respect to the vertical side part 310 at a predetermined angle. The first inclination part 320 may be inclined with respect to the vertical side part 310 at an angle of from about 30 degrees to about 60 degrees. For example, the first inclination part 320 may have an angle of about 45 degrees with respect to the vertical side part 310.

The first horizontal part 330 may be substantially parallel with the upper surface and the lower surface of the plastic layer 110. The first horizontal part 330 may connect the first inclination part 320 and the second inclination part 340.

The second inclination part 340 may connect the first horizontal part 330 and the upper surface of the first hard coating layer 120. The second inclination part 340 may be inclined with respect to the first horizontal part 330 at a predetermined angle. The second inclination part 340 may be inclined with respect to the first horizontal part 330 at an angle of from about 30 degrees to about 60 degrees. For example, the second inclination part 340 may have an angle of about 38 degrees with respect to the first horizontal part 330.

The third inclination part 350 may connect the vertical side part 310 and the second horizontal part 360 and may be inclined with respect to the vertical side part 310 at a predetermined angle. The third inclination part 350 may be substantially symmetrical to the first inclination part 320.

The second horizontal part 360 may be substantially parallel with the upper surface and the lower surface of the plastic layer 110. The second horizontal part 360 may connect the third inclination part 350 and the fourth inclination part 370. The second horizontal part 360 may be substantially symmetrical to the first horizontal part 330.

The fourth inclination part 370 may connect the second horizontal part 360 and the lower surface of the second hard coating layer 130. The fourth inclination part 370 may be inclined with respect to the second horizontal part 360 at a predetermined angle. The fourth inclination part 370 may be substantially symmetrical to the second inclination part 340.

The vertical side part 310, the first inclination part 320, and the third inclination part 350 may include a mechanical processing trace. The vertical side part 310, the first inclination part 320, and the third inclination part 350 may be positioned at the edge of the plastic layer 110. As an example, the mechanical processing may be performed by a method using a computer numerical control (CNC) processing machine.

The first horizontal part 330, the second inclination part 340, the second horizontal part 360, and the fourth inclination part 370 may include the laser processing trace. The first horizontal part 330 and the second horizontal part 360 may be positioned at the edge of the plastic layer 110. A first part of the second inclination part 340 and a first part of the fourth inclination part 370 may be positioned at the edge of the plastic layer 110, and a second part of the second inclination part 340 may be positioned at the edge of the first hard coating layer 120, and a second part of the fourth inclination part 370 may be positioned at the edge of the second hard coating layer 130. As an example, a portion of the first hard coating layer 120 adjacent to the first inclination part 320 and the portion of the second hard coating layer 130 adjacent to the third inclination part 350 may include the laser processing trace.

The vertical side part 310 may be separated from the second inclination part 340 and may be separated from the fourth inclination part 370. That is, the vertical side part 310 may have a protruding shape with respect to the plastic layer 110. Thus, when an external impact is applied to a side of the cover window (e.g., cover window 10), a possibility that the vertical side part 310 receives the impact is relatively high. The vertical side part 310 may protrude from the plastic layer 110 such that the possibility that the first hard coating layer 120 and the second hard coating layer 130 receive the impact is relatively low. Thus, in an exemplary embodiment of the present invention, an occurrence of a crack at the edge of the first hard coating layer 120 and/or the second hard coating layer 130 may be reduced or prevented.

The first hard coating layer 120 and second hard coating layer 130 may be relatively hard, and thus a mechanical processing trace may remain at edges of the first hard coating layer 120 and/or the second hard coating layer 130. When the mechanical processing trace remains, there may be an increased possibility of the crack being caused at edges of the first hard coating layer 120 and/or the second hard coating layer 130 by the bending of the cover window (e.g., cover window 110). In an exemplary embodiment of the present invention, the mechanical processing trace does not remain at the edges of the first hard coating layer 120 and the second hard coating layer 130, and only the laser processing trace remains. Thus, the edges of the first hard coating layer 120 and the second hard coating layer 130 have a substantially even shape, and thus an occurrence of a crack may be reduced or prevented during bending of the cover window (e.g., cover window 10).

The cover window according to an exemplary embodiment of the present invention may prevent the crack from being generated by the bending and the impact at the edges of the first hard coating layer 120 and the second hard coating layer 130.

A shape of the edge of the cover window according to an exemplary embodiment of the present invention will be described in more detail below with reference to FIG. 4.

Figure 4:
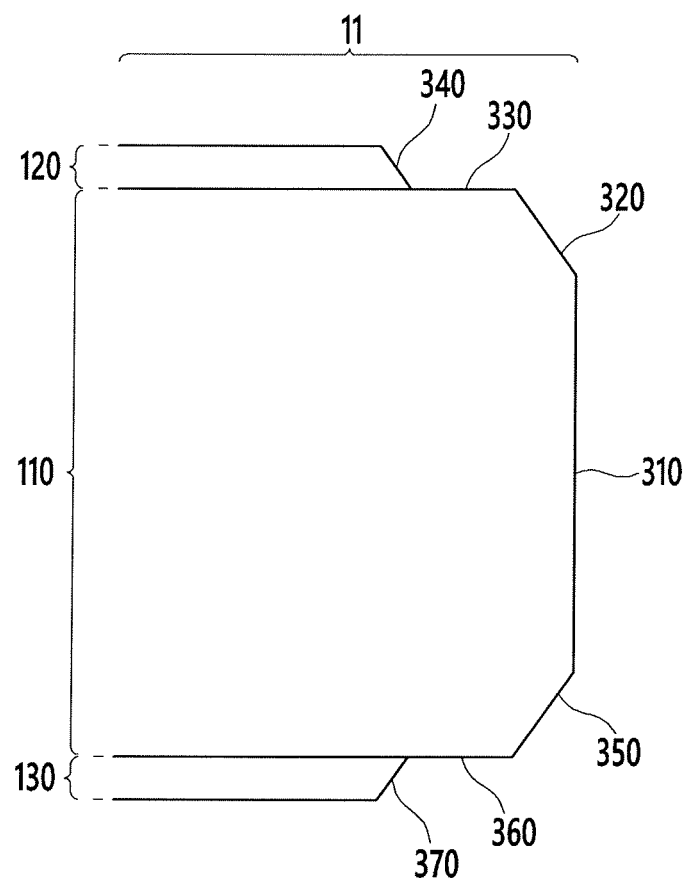
FIG. 4 is a cross-sectional view of an edge of a cover window according to an exemplary embodiment of the present invention.

The cover window according to an exemplary embodiment of the present invention described with reference to FIG. 4 is substantially the same as the cover window according to an exemplary embodiment of the present invention described with reference to FIG. 2 and FIG. 3, and thus duplicative descriptions may be omitted. According to the exemplary embodiment of the present invention described with reference to FIG. 4, the edge shape of the plastic layer may be different from the edge shape according to the exemplary embodiment of the present invention described with reference to FIG. 2 and FIG. 3. Thus, the edge shape of the plastic layer according to an exemplary embodiment of the present invention will be described in more detail below with reference to FIG. 4.

FIG. 4 is a cross-sectional view showing an edge of a cover window according to an exemplary embodiment of the present invention.

Referring to FIG. 4, the cover window 11 according to an exemplary embodiment of the present invention may include the plastic layer 110 and the first hard coating layer 120 positioned at the upper surface of the plastic layer 110, and may include the second hard coating layer 130 positioned at the lower surface of the plastic layer 110. The shape of the first hard coating layer 120 and the second hard coating layer 130 may be substantially symmetrical.

The edge of the cover window 11 may include a vertical side part 310 positioned at the center of the plastic layer 110 in the thickness direction, the first inclination part 320 connected to the vertical side part 310, the first horizontal part 330 connected to the first inclination part 320, and the second inclination part 340 connected to the first horizontal part 330. The edge of the cover window may include the third inclination part 350 connected to the vertical side part 310, the second horizontal part 360 connected to the third inclination part 350, and the fourth inclination part 370 connected to the second horizontal part 360. The first inclination part 320, the first horizontal part 330, and the second inclination part 340 may be substantially symmetrical to the third inclination part 350, the second horizontal part 360, and the fourth inclination part 370, respectively.

The first horizontal part 330 and the second horizontal part 360 according to an exemplary embodiment of the present invention may include the laser processing trace, however exemplary embodiments of the present invention are not limited thereto. For example, the first horizontal part 330 and the second horizontal part 360 need not include the laser processing trace. The first horizontal part 330 and the second horizontal part 360 may include a step, and thus the first horizontal part 330 may be lower than the upper surface of the plastic layer 110, however exemplary embodiments of the present invention are not limited thereto. For example, the first horizontal part 330 and the second horizontal part 360 have a substantially shape that is substantially parallel with the upper surface of the plastic layer 110.

The first part of the second inclination part 340 may be positioned at the edge of the plastic layer 110 and the second part of the second inclination part 340 may be positioned at the edge of the first hard coating layer 120, however exemplary embodiments of the present invention are not limited thereto. For example, the second inclination part 340 may be entirely positioned at the edge of the first hard coating layer 120.

The first part of the fourth inclination part 370 may be positioned at the edge of the plastic layer 110 and the second part of the fourth inclination part 370 may be positioned at the edge of the second hard coating layer 130, however exemplary embodiments of the present invention are not limited thereto. For example, the fourth inclination part 370 may be entirely positioned at the edge of the second hard coating layer 130.

The vertical side part 310 may be separated from the second inclination part 340 and may be separated from the fourth inclination part 370, and thus the vertical side part 310 may have a protruding shape with respect to the plastic layer 110. The mechanical processing trace might not remain at the edges of the first hard coating layer 120 and the second hard coating layer 130, and only the laser processing trace remains according to an exemplary embodiment of the present invention. Thus, the cover window according to an exemplary embodiment of the present invention may reduce or prevent an occurrence of cracks generated by the bending and the impact in the edges of the first hard coating layer 120 and the second hard coating layer 130.

The shape of the edge of the cover window according to an exemplary embodiment of the present invention will be described in more detail below with reference to FIG. 5.

Figure 5:
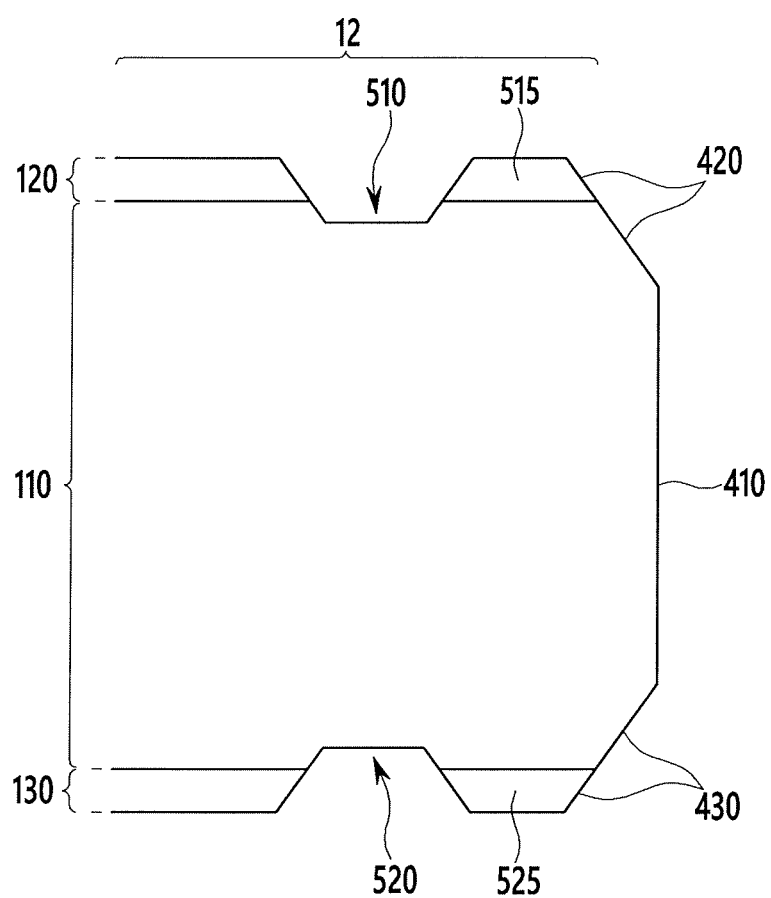
FIG. 5 is a cross-sectional view of an edge of a cover window according to an exemplary embodiment of the present invention.

A cover window 12 according to an exemplary embodiment of the present invention described with reference to FIG. 5 is substantially the same as the cover window according to the exemplary embodiment of the present invention described with reference to FIG. 2 and FIG. 3, and thus duplicative descriptions may be omitted. In the exemplary embodiment of the present invention described with reference to FIG. 5, the position where the laser processing trace remains is partially different from that of the exemplary embodiment of the present invention described with reference to FIG. 2 and FIG. 3. Thus, the position where the laser processing trace remains according to an exemplary embodiment of the present invention will be described in more detail below with reference to FIG. 5.

FIG. 5 is a cross-sectional view showing an edge of a cover window according to an exemplary embodiment of the present invention.

Referring to FIG. 5, the cover window 12 according to an exemplary embodiment of the present invention may include the plastic layer 110 and the first hard coating layer 120 positioned at the upper surface of the plastic layer 110, and may include the second hard coating layer 130 positioned at the lower surface of the plastic layer 110. The shape of the first hard coating layer 120 and the second hard coating layer 130 may be substantially symmetrical.

The edge of the cover window 12 may include a vertical side part 410 positioned at the center of the plastic layer 110 in the thickness direction and a first inclination part 420 connected to the vertical side part 410. The edge of the cover window may include a second inclination part 430 connected to the vertical side part 410.

The vertical side part 410 may include a surface that is substantially perpendicular to the upper surface and the lower surface of the plastic layer 110. The first inclination part 420 and the second inclination part 430 may be inclined with respect to the vertical side part 410 at a predetermined angle.

The vertical side part 410, the first inclination part 420, and the second inclination part 430 may include the mechanical processing trace. The vertical side part 410 may be positioned at the edge of the plastic layer 110. A first part of the first inclination part 420 may be positioned at an edge of the plastic layer 110, and a second part of the first inclination part 420 may be positioned at an edge of the first hard coating layer 120. A first part of the second inclination part 430 may be positioned at an edge of the plastic layer 110 and a second part of the second inclination part 430 positioned at the second hard coating layer 130.

The edge of the cover window 12 may include a first groove 510 adjacent to the first inclination part 420 and a second groove 520 adjacent to the second inclination part 430.

The first groove 510 may be positioned at the upper surface of the cover window. The first groove 510 may be relatively close and adjacent to the first inclination part 420 without being connected to the first inclination part 420. A first island pattern part 515 may be positioned between the first groove 510 and the first inclination part 420. The first island pattern part 515 may be disposed on the plastic layer 110.

The second groove 520 may be positioned at the lower surface of the cover window 12. The second groove 520 may be relatively close and adjacent to the second inclination part 430 without being connected to the second inclination part 430. A second island pattern part 525 may be positioned between the second groove 520 and the second inclination part 430. The second island pattern part 525 may be disposed on the plastic layer 110.

The first groove 510 and the second groove 520 may include the laser processing trace.

The first groove 510 may be formed through the first hard coating layer 120 and through the edge of the plastic layer 110. However, exemplary embodiments of the present invention are not limited thereto. For example, the first groove 510 may be formed in the first hard coating layer 120, but need not be formed in the plastic layer 110. The depth of the first groove 510 may be larger than or equal to the thickness of the first hard coating layer 120. When the depth of the first groove 510 is larger than the thickness of the first hard coating layer 120, the first groove 510 may be formed in the first hard coating layer 120 and the plastic layer 110. When the depth of the first groove 510 is the same as the thickness of the first hard coating layer 120, the first groove 510 may be formed in the first hard coating layer 120.

The second groove 520 may be formed through the second hard coating layer 130 and through the edge of the plastic layer 110. However, exemplary embodiments of the present invention are not limited thereto. For example, the second groove 520 may be formed in the second hard coating layer 130, but need not be formed in the plastic layer 110. The depth of the second groove 520 may be larger than or equal to the thickness of the second hard coating layer 130. When the depth of the second groove 520 is larger than the thickness of the second hard coating layer 130, the second groove 520 may be formed in the second hard coating layer 130 and the plastic layer 110. When the depth of the second groove 520 is the same as the thickness of the second hard coating layer 130, the second groove 520 may be formed in the second hard coating layer 130.

The vertical side part 410 may be separated from the first groove 510 and the second groove 520. Thus, when an external impact is applied to the side of the cover window (e.g., side window 12), the possibility of the vertical side part 410 receiving the impact may be increased. The vertical side part 410 may protrude from the plastic layer 110 such that the possibility of the first hard coating layer 120 and the second hard coating layer 130 receive the impact is relatively low. Even if the first hard coating layer 120 and the second hard coating layer 130 receive the impact, the first island pattern part 515 or the second island pattern part 525 may absorb the impact and reduce or eliminate an occurrence of a crack. Since the first island pattern part 515 is separated from the rest of the first hard coating layer 120 by the first groove 510, even if the crack is generated by the impact in the first island pattern part 515, the growth of the crack may be reduced or prevented. Since the second island pattern part 525 is separated from the rest of the second hard coating layer 130 by the second groove 520, even if the impact is generated in the second island pattern part 525, the growth of the crack may be reduced or prevented.

The first hard coating layer 120 and the second hard coating layer 130 may be relatively hard, thus a mechanical processing trace may remain at edges of the first hard coating layer 120 and/or the second hard coating layer 130, and thus the edges may be relatively uneven such that there is a possibility of the crack being caused by the bending. In an exemplary embodiment of the present invention, the first inclination part 420 may be positioned at the first hard coating layer 120, the second inclination part 430 may be positioned at the second hard coating layer 130, and the first inclination part 420 and the second inclination part 430 may include the mechanical processing trace. Thus, an occurrence of a crack may be reduced or prevented in the edges of the first hard coating layer 120 and the second hard coating layer 130. For example, the crack may be generated in the first island pattern part 515 of the first hard coating layer 120 and/or the second island pattern part 525 of the second hard coating layer 130. The first island pattern part 515 is separated from the rest of the first hard coating layer 120 by the first groove 510 such that the growth of the crack may be prevented even if the crack is generated by the bending in the first island pattern part 515. The second island pattern part 525 is separated from the rest of the second hard coating layer 130 by the second groove 520 such that the growth of the crack may be prevented even if the crack is generated by the bending in the second island pattern part 525.

The cover window according to an exemplary embodiment of the present invention may reduce or prevent the growth of the crack even if the crack is generated by the bending and the impact in the edges of the first hard coating layer 120 and the second hard coating layer 130.

A manufacturing method of a cover window according to an exemplary embodiment of the present invention will be described in more detail below with reference to FIG. 6 to FIG. 11.

Figure 6:
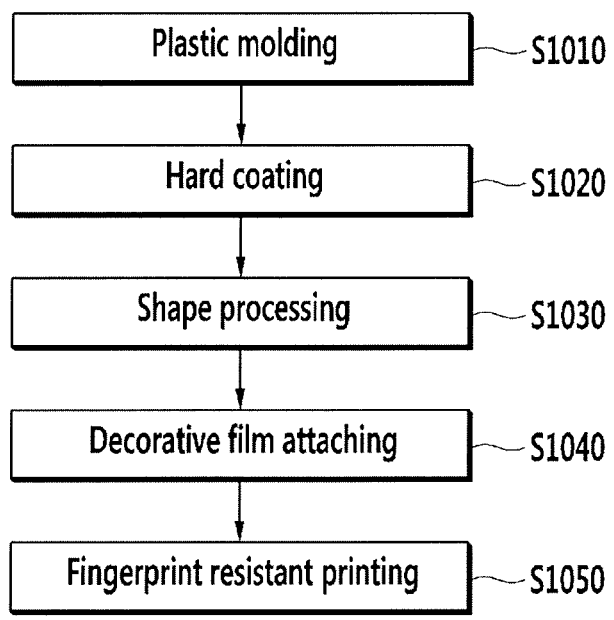
FIG. 6 is a flowchart showing a manufacturing method of a cover window according to an exemplary embodiment of the present invention.

FIG. 6 is a flowchart showing a manufacturing method of a cover window according to an exemplary embodiment of the present invention. FIG. 7 to FIG. 11 are perspective views showing a manufacturing method of a cover window according to an exemplary embodiment of the present invention.

Referring to FIG. 6, a method of manufacturing a cover window may include forming a plastic molding S1010 for the cover window, hard coating the cover window S1020, processing a shape of the cover window S1030, attaching a decorative film to the cover window S1040, and performing fingerprint resistant printing on a surface of the cover window S1050.

Forming a plastic molding S1010 will be described in more detail below with reference to FIG. 7.

Figure 7:
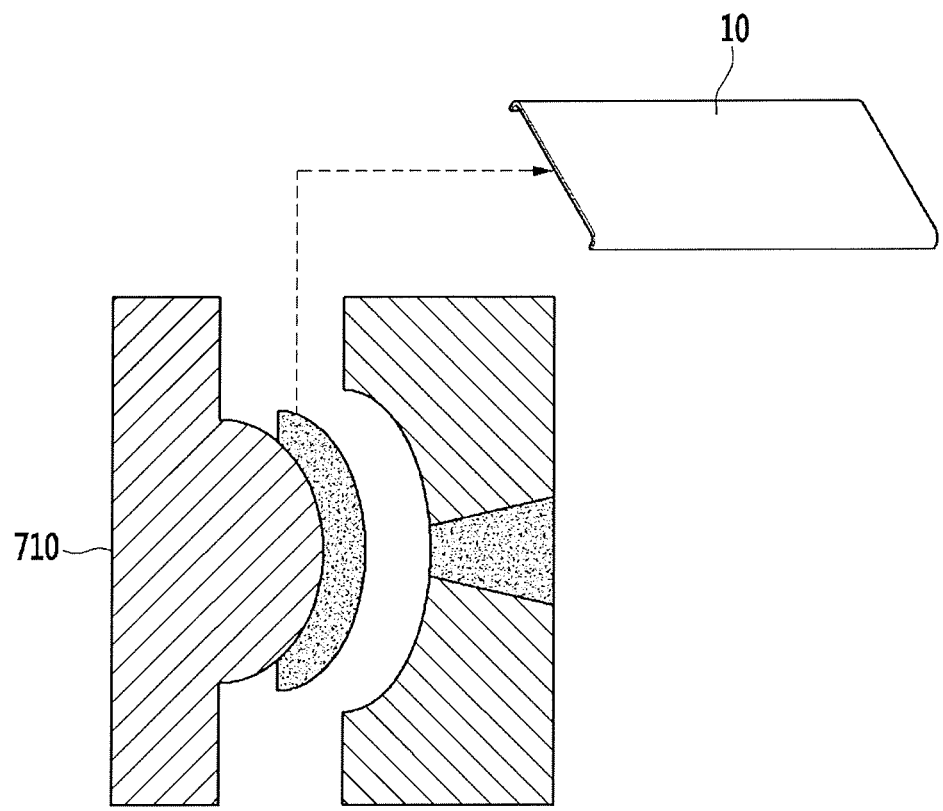
FIG. 7 to FIG. 11 are perspective views showing a manufacturing method of a cover window according to an exemplary embodiment of the present invention.

Referring to FIG. 7, a pigment, a stabilizer, a plasticizer, and a filler are added to a plastic material, put in a hopper and heated to form a plastic material n a liquid state. The plastic material may include, for example. a PMMA (polymethylmethacrylate) series or polycarbonate series plastic. The plastic material in the liquid state may be injected into a mold 710. For example, the plastic in the liquid state may be injected into the mold 710 through an inlet by a piston. The mold 710 may include two parts that may be separated from each other. The plastic material may be solidified in the mold when the two parts of the mold are together, and after solidifying the plastic material the two parts may be separated and the solidified plastic may be removed. Thus, a base shape of a cover window (e.g., the cover window 10) may be formed.

Hard coating the cover window S1020 will be described in more detail below with reference to FIG. 8.

Figure 8:
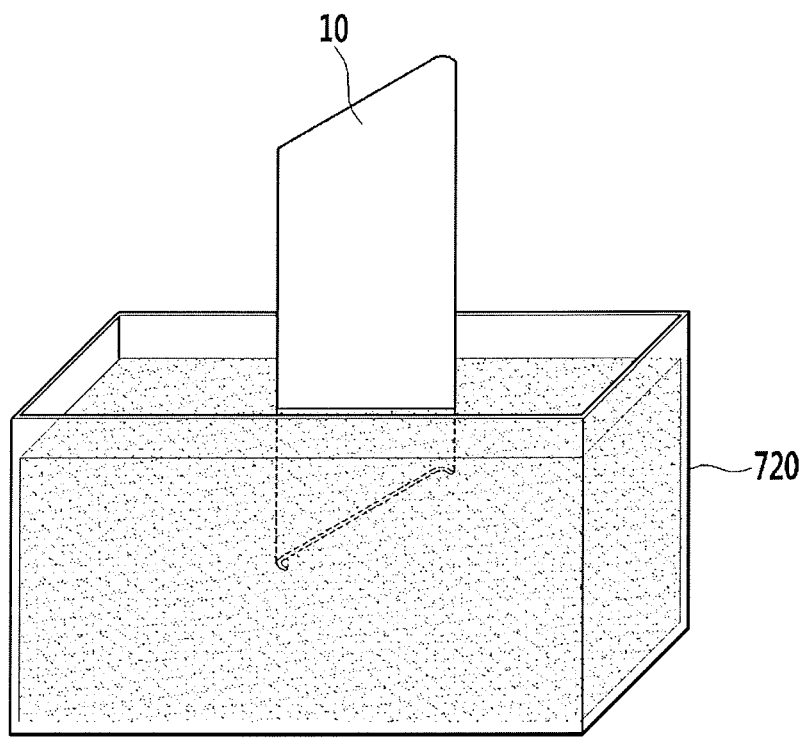

Referring to FIG. 8, the cover window may be immersed in a water tank 720 and a hard coating layer may be formed. The hard coating layer may include a first hard coating layer (e.g., the first hard coating layer 120) and a second hard coating layer (e.g., the second hard coating layer 130). The first hard coating layer and the second hard coating layer may be formed at the upper surface and the lower surface of the plastic layer, respectively. A material included in the hard coating layer may include an organic material such as an ultraviolet ray hardening acrylate series material and/or an ultraviolet ray hardening epoxy series material. A material included in the hard coating layer may include an organic/inorganic mixture material further including an inorganic material such as a nano-silica sol material. The hard coating layer may have a hardness that is more than an HB pencil hardness.

Processing a shape of the cover window S1030 will be described in more detail below with reference to FIG. 9.

Figure 9:
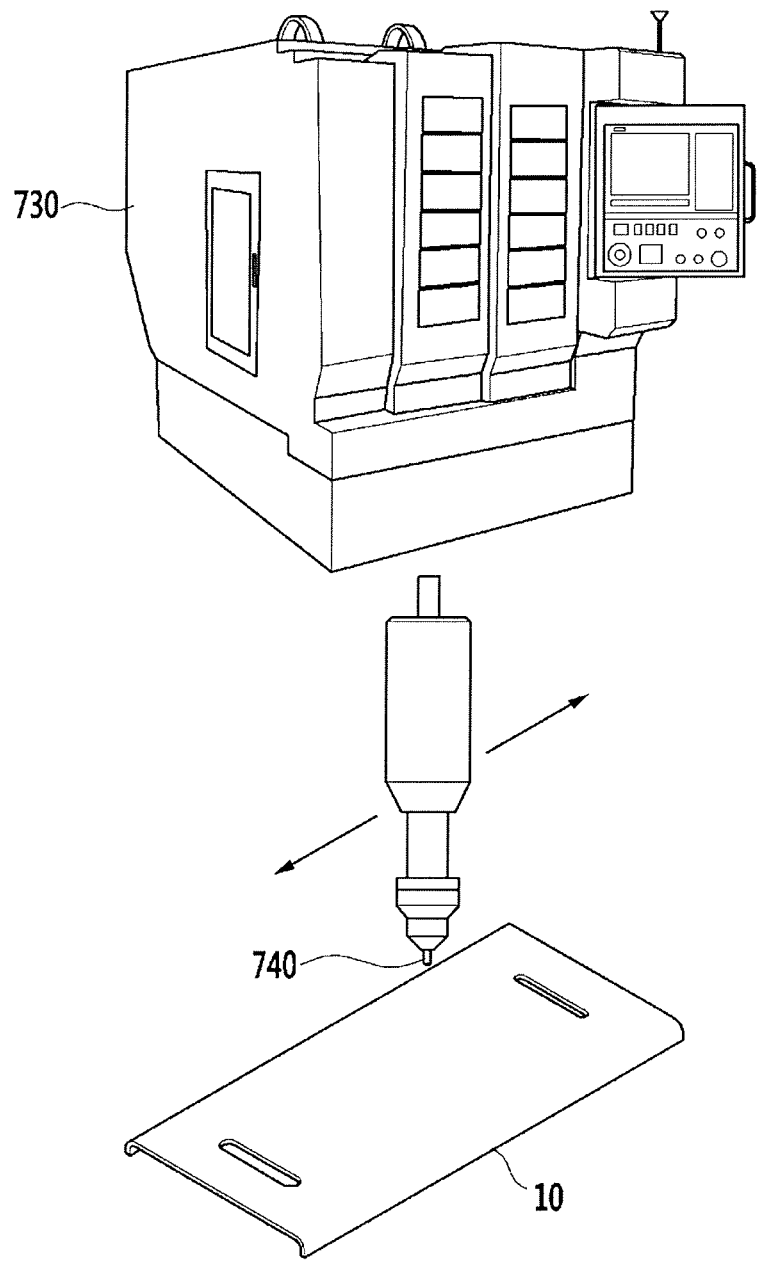

Referring to FIG. 9, the shape of the hard-coated cover window may be processed. The cover window may be mechanically processed by using a computer numerical control (CNC) processing machine 730. The processing may be performed while a blade 740 is rotated in high speed and an edge of the cover window is cut. A process of irradiating an edge of the cover window using a laser may be preformed following the mechanical processing.

Attaching a decorative film to the cover window S1040 will be described in more detail below with reference to FIG. 10.

Figure 10:
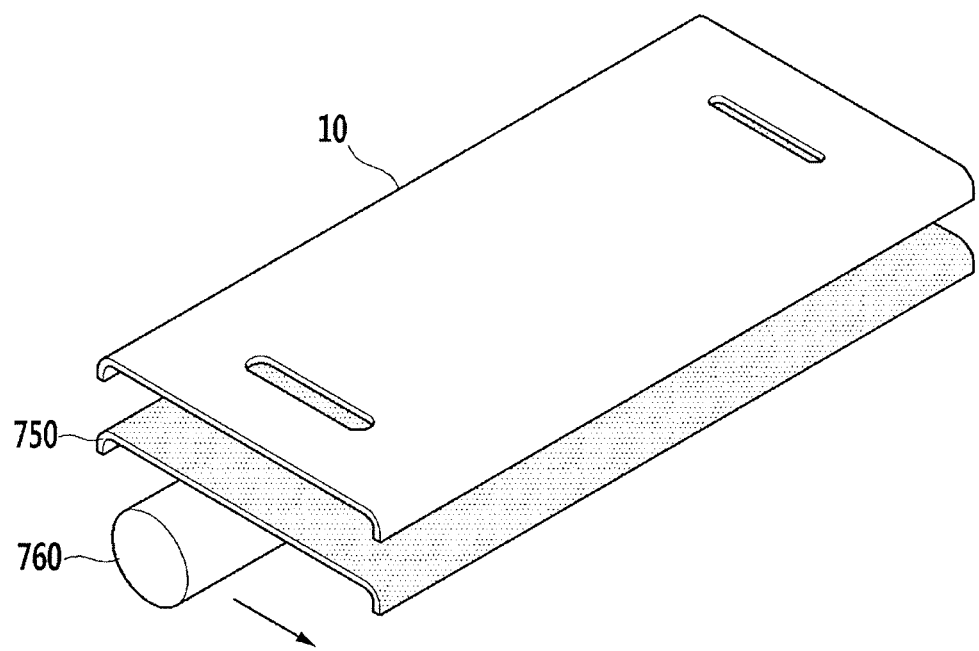

Referring to FIG. 10, a decorative film 750 may be attached to a lower surface of the cover window. While the decorative film 750 is positioned under the cover window and a roller 760 is rotated, the decorative film 750 may be attached to the cover window. The decorative film 750 may include, for example, a company logo Performing fingerprint resistant printed on a surface of the cover window S1050 will be described in more detail below with reference to FIG. 11.

Figure 11:
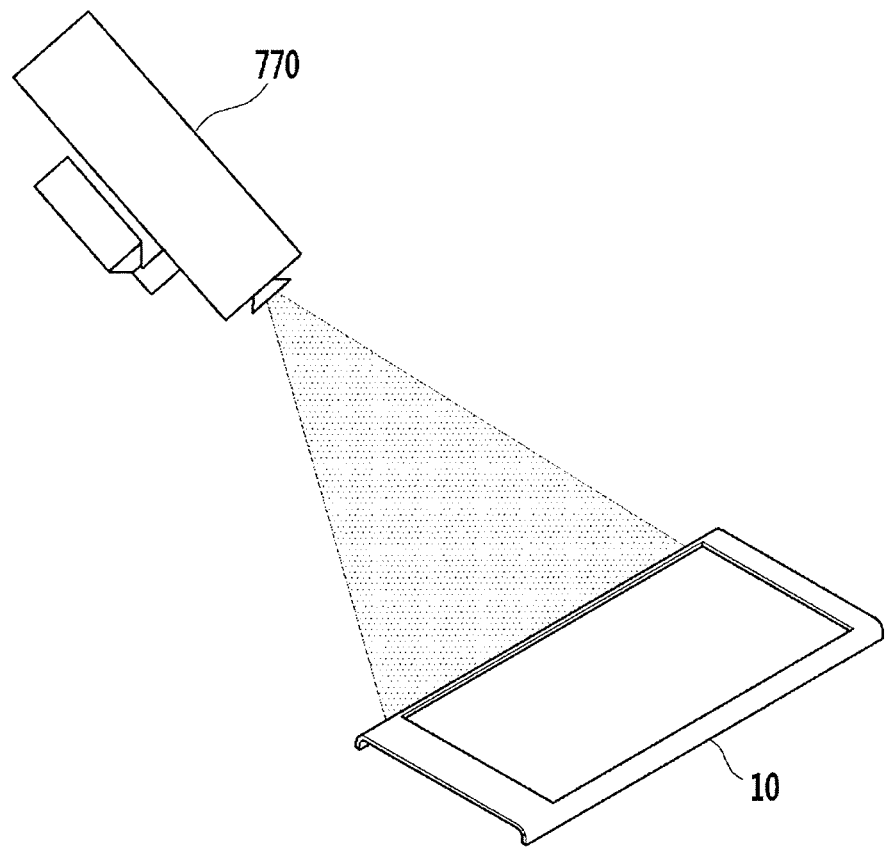

Referring to FIG. 11, fingerprint resistant printing S1050 may be performed on a surface of the cover window by using an electron beam depositor 770. Thus, even if the surface of the cover window is touched, a presence of fingerprints may be reduced or eliminated.

The shape processing process of the cover window described with reference to FIG. 9 will be described in more detail below with reference to FIG. 12 to FIG. 14.

Figure 12:
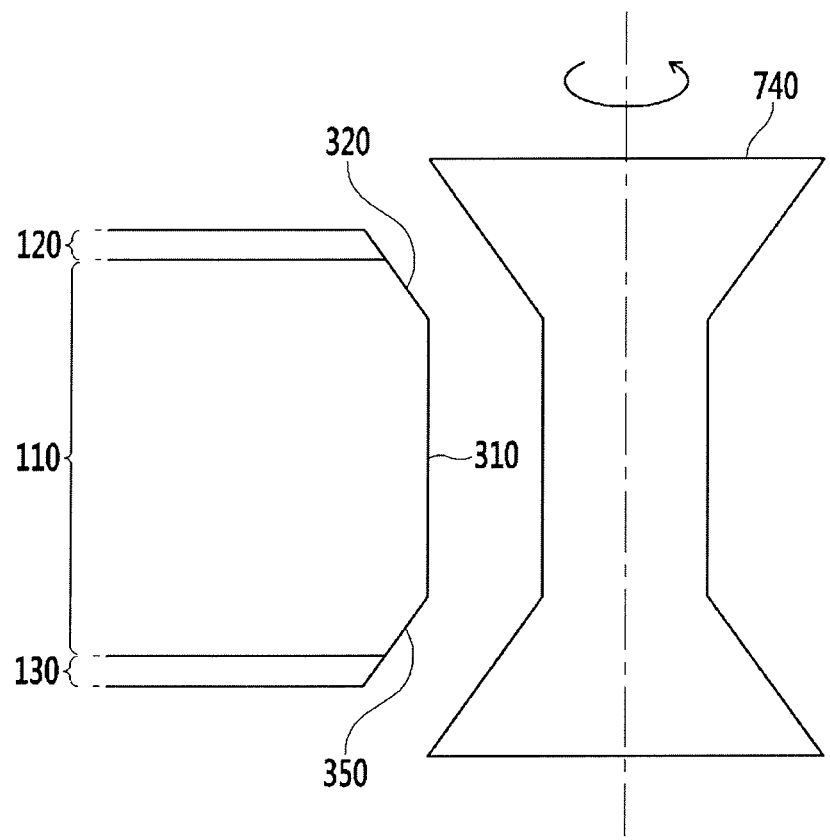
FIG. 12 to FIG. 14 are cross-sectional views showing a shape processing process of a cover window according to an exemplary embodiment of the present invention.
Figure 13:
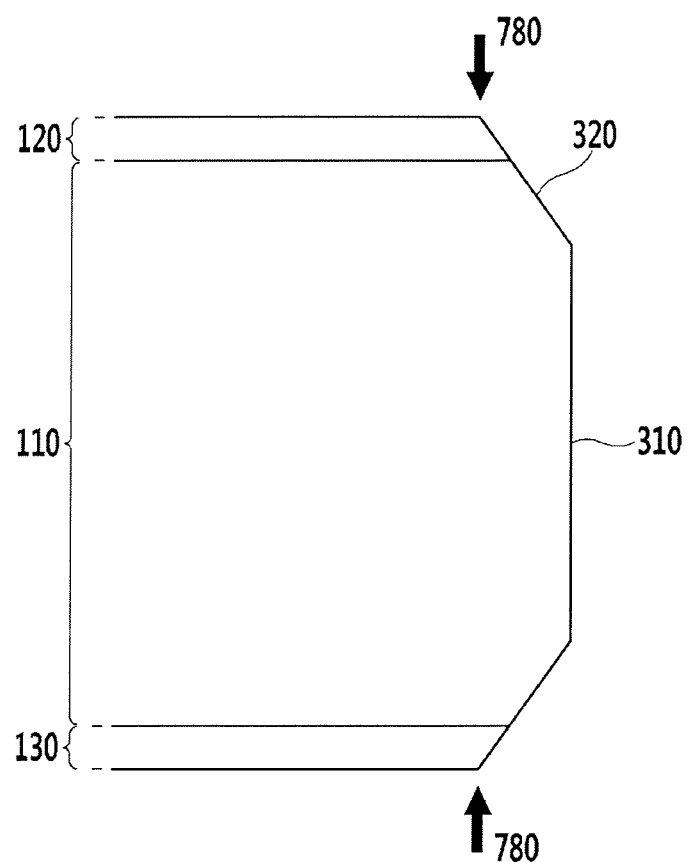
Figure 14:
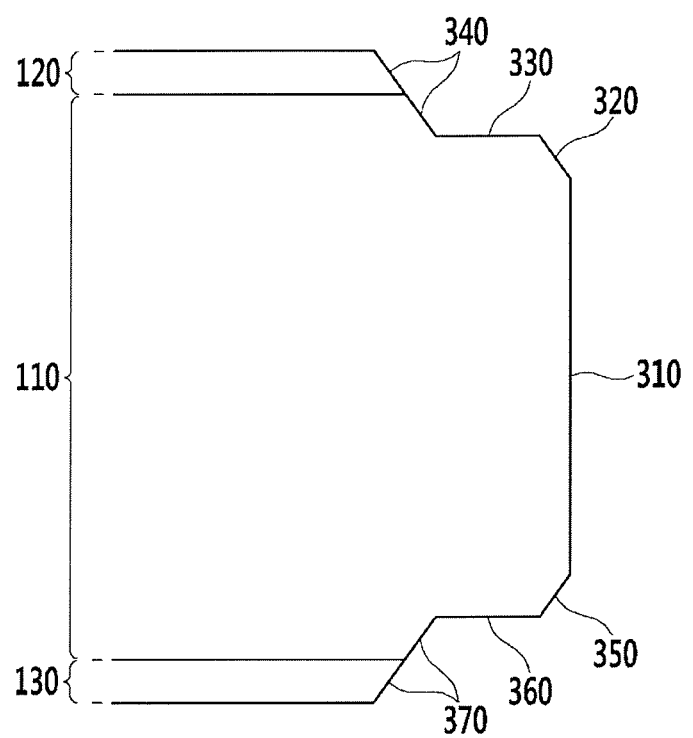

FIG. 12 to FIG. 14 are cross-sectional views showing a shape processing process of a cover window according to an exemplary embodiment of the present invention.

Referring to FIG. 12, mechanical processing may be performed to the edge of a cover window (e.g., the cover window 10). The cover window may include the plastic layer 110 and the first hard coating layer 120 positioned at the upper surface of the plastic layer 110. The cover window may include the second hard coating layer 130 positioned at the lower surface of the plastic layer 110. The mechanical processing may be performed to the edges of the plastic layer 110, the first hard coating layer 120, and the second hard coating layer 130. While the blade 740 is rotated based on a vertical axis, the edges of the plastic layer 110, the first hard coating layer 120, and the second hard coating layer 130 may be cut.

The shape of the cover window may be changed depending on the shape of the blade 740. In an exemplary embodiment of the present invention, the blade 740 may have a shape in which a radius of a center part is substantially constant, and the radius increases from the center part to a lower side and an upper side. The cut edge of the cover window may include the vertical side part 310, the first inclination part 320, and the third inclination part 350 formed by the mechanical processing.

The vertical side part 310 may be a surface of the cover window that is substantially perpendicular to the upper surface and the lower surface of the plastic layer 110. The vertical side part 310 may be positioned at an edge of the plastic layer 110.

The first inclination part 320 may be inclined with respect to the vertical side part 310 at a predetermined angle. A first part of the first inclination part 320 may be positioned at an edge of the plastic layer 110 and a second part of the first inclination part 320 may be positioned at an edge of the first hard coating layer 120.

The third inclination part 350 may be inclined with respect to the vertical side part 310 at a predetermined angle. A first part of the third inclination part 350 may be positioned at an edge of the plastic layer 110 and a second part of the third inclination part 350 may be positioned at an edge of the second hard coating layer 130.

Referring to FIG. 13, laser processing may be performed to the mechanically processed edge of the cover window. For example, the laser processing may be performed to the edge of the first hard coating layer 120 and the second hard coating layer 130 of the cover window.

A laser 780 may be radiated along the first inclination part 320 and along the third inclination part 350. For example, the laser 780 may be radiated along the first part of the first inclination part 320 positioned at the edge of the plastic layer 110 and along the second part of the first inclination part 320 positioned at the edge of the first hard coating layer 120; and the laser 780 may be radiated along the first part of the third inclination part 350 positioned at the edge of the plastic layer 110 and along the second part of the third inclination part 350 positioned at the edge of the second hard coating layer 130. However, exemplary embodiments of the present invention are not limited thereto.

The laser 780 may be radiated more inside than the position where the first inclination part 320 of the first hard coating layer 120 starts, and the laser 780 may be radiated more inside than the position where the third inclination part 350 of the second hard coating layer 130 starts.

The laser 780 may be substantially simultaneously radiated to the first hard coating layer 120 and the second hard coating layer 130, or the laser may be radiated to the first hard coating layer 120 and the second hard coating layer 130 at different times. After the laser is first radiated to the first hard coating layer 120, the cover window may be turned over and the laser may be radiated to the second hard coating layer 130. The laser processing may employ a carbon dioxide gas laser.

Referring to FIG. 14, the first horizontal part 330, the second inclination part 340, the second horizontal part 360, and the fourth inclination part 370 may be formed at the edge of the cover window by the laser 780.

A laser processing trace may remain at the first horizontal part 330, the second inclination part 340, the second horizontal part 360, and the fourth inclination part 370. For example, bubbles or craters may be found. A mechanical processing trace may remain at the vertical side part 310, the first inclination part 320, and the third inclination part 350. Before performing the laser processing, the mechanical processing trace may be at the edges of the first hard coating layer 120 and the second hard coating layer 130. The mechanical processing trace formed at the edges of the first hard coating layer 120 and the second hard coating layer 130 may be removed by the laser processing process according to an exemplary embodiment of the present invention.

In the laser processing process, intensity and time of the laser radiation may be controlled. For example, until the plastic layer 110 is at least exposed, the laser may be radiated to the first hard coating layer 120 and the second hard coating layer 130. After the plastic layer 110 is exposed, if the laser is radiated to the first hard coating layer 120 and the second hard coating layer 130, the second inclination part 340 and the fourth inclination part 370 may be formed at the plastic layer 110. If the laser is radiated to the first hard coating layer 120 and the second hard coating layer 130, the plastic layer 110 might be exposed and the second inclination part 340 and the fourth inclination part 370 may be omitted (see, e.g., FIG. 4).

The radiation intensity may be controlled by changing a power of the laser. The power of the laser may be set to be different depending on the thickness of the first hard coating layer 120 and the second hard coating layer 130. For example, when the thickness of the first hard coating layer 120 and the second hard coating layer 130 is from 0 μm to about 5 μm, the power of the laser may be from about 2.5 W to about 3.5 W. When the thickness of the first hard coating layer 120 and the second hard coating layer 130 is from about 5 μm to about 10 μm, the power of the laser may be from about 3.0 W to about 4.0 W. When the thickness of the first hard coating layer 120 and the second hard coating layer 130 is from about 10 μm to about 15 μm, the power of the laser may be from about 3.5 W to about 4.5 W.

When the thickness of the first hard coating layer 120 and the second hard coating layer 130 is from about 15 μm to about 20 μm, the power of the laser may be from about 4.0 W to about 5.0 W. When the thickness of the first hard coating layer 120 and the second hard coating layer 130 is from about 20 μm to about 25 μm, the power of the laser may be from about 4.5 W to about 5.5 W. The power of the laser may refer to power that is actually output from the laser.

The shape of the edge of the cover window may be changed depending on the radiation position of the laser in the laser processing process. For example, the laser may be radiated to form the first groove 510 in the first hard coating layer 120 and/or the second groove 520 in the second hard coating layer 130.

A depth of the first groove 510 and a depth of the second groove 520 may be controlled by controlling the radiation intensity of the laser. The depth of the first groove 510 may be larger than or equal to the thickness of the first hard coating layer 120. The depth of the second groove 520 may be larger than or equal to the thickness of the second hard coating layer 130.

A shape of an edge of the cover window resulting from a manufacturing process according to an exemplary embodiment of the present invention will be described in more detail below with reference to FIG. 15 to FIG. 17.

Figure 15:
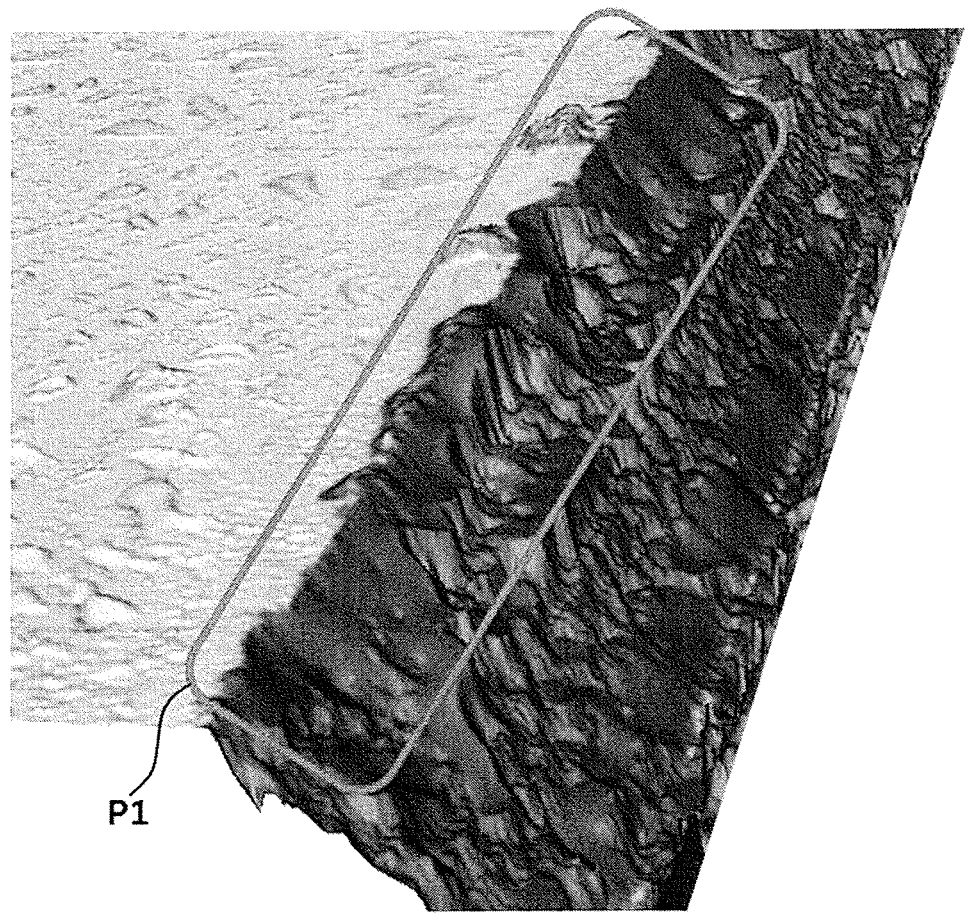
FIG. 15 is a view showing an edge of a cover window according to an exemplary embodiment of the present invention after mechanical processing.

FIG. 15 is a view showing an edge of a cover window according to an exemplary embodiment of the present invention after mechanical processing. FIG. 16 and FIG. 17 are views showing an edge of a cover window according to an exemplary embodiment of the present invention after laser processing. FIG. 15 to FIG. 17 show 3D images of a cover window that is manufactured according to an exemplary embodiment of the present invention.

Referring to FIG. 15, a shape of an edge part P1 of a cover window after performing mechanical processing may have a relatively uneven shape. If the cover window is bent in this state, a crack may be generated at the edge part P1 of a first hard coating layer. The generated crack may gradually grow such that the other portion of the first hard coating layer may be affected.

Figure 16:
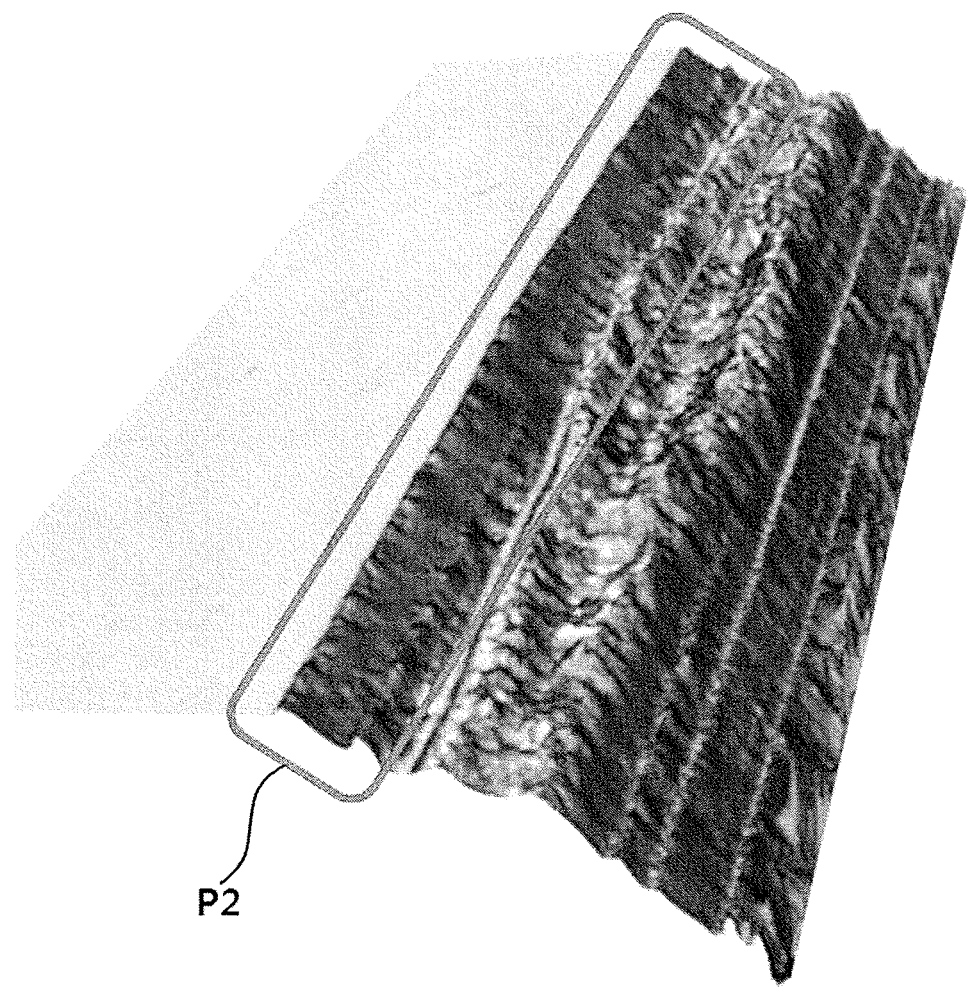
FIG. 16 and FIG. 17 are views showing an edge of a cover window according to an exemplary embodiment of the present invention after laser processing.

Referring to FIG. 16, a shape of an edge part P2 after performing the laser processing may have a relatively even shape compared with the edge part P1. In this state, even if the cover window is bent, a crack might not be generated in the edge part P2 of the first hard coating layer.

Figure 17:
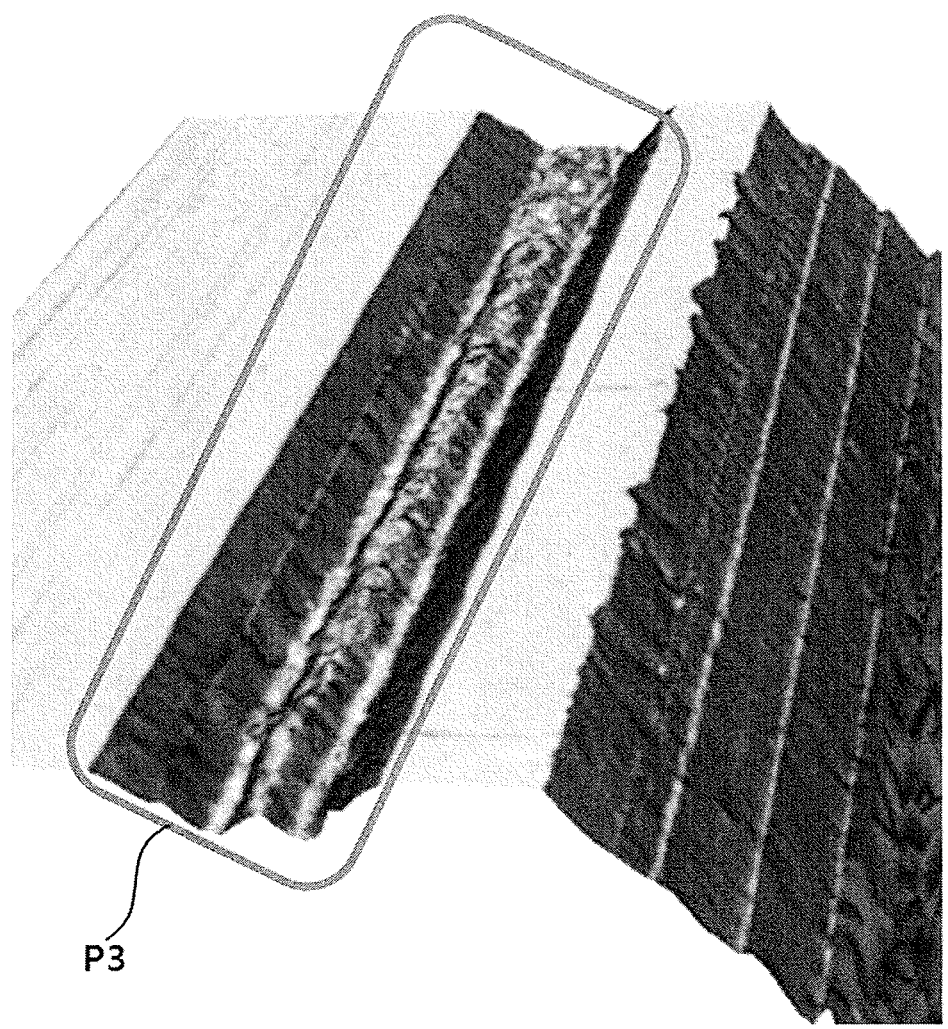

Referring to FIG. 17, a first groove may be formed at a third part P3 by laser processing. The part P3 where the first groove is formed may have a relatively even shape. In this state, if the cover window is bent, even if a crack is generated at the first hard coating layer, the crack might not spread past the third part P3. Thus, the crack might now spread in the first hard coating layer beyond the first groove formed at the third part P3.

While the present invention has been shown and described with reference to the exemplary embodiments thereof, it will be apparent to those of ordinary skill in the art that various changes in form and detail may be made thereto without departing from the spirit and scope of the present invention.

What is claimed is:

1. A cover window, comprising:
   a plastic layer and a first coating layer disposed on an upper surface of the plastic layer, wherein an edge of the cover window includes:
   a vertical side part perpendicular to the upper surface of the plastic layer; and
   a first inclination part connected to the vertical side part and inclined with respect to the vertical side part, wherein the vertical side part and the first inclination part include a mechanical processing trace, and wherein an edge of the first coating layer adjacent to the first inclination part includes a laser processing trace, wherein the edge of the cover window further includes: a first horizontal part connected to the first inclination part; and a second inclination part connected to the first horizontal part.

2. The cover window of claim 1, wherein the first horizontal part and the second inclination part include the laser processing trace.

3. The cover window of claim 2, wherein: the vertical side part, the first inclination part, the first horizontal part, and a first part of the second inclination part are positioned at an edge of the plastic layer; and a second part of the second inclination part is positioned at an edge of the first coating layer.

4. The cover window of claim 1, wherein the second inclination part includes the laser processing trace.

5. The cover window of claim 4, wherein: the vertical side part, the first inclination part, and the first horizontal part are positioned at the edge of the plastic layer; and the second inclination part is positioned at an edge of the first coating layer.

6. The cover window of claim 1, further comprising a second coating layer disposed on a lower surface of the plastic layer, wherein the edge of the cover window further includes a third inclination part connected to the vertical side part and inclined with respect to the vertical side part, a second horizontal part connected to the third inclination part, and a fourth inclination part connected to the second horizontal part, wherein the first inclination part, the first horizontal part, and the second inclination part are substantially symmetrical to the third inclination part, the second horizontal part, and the fourth inclination part, respectively.

7. A cover window, comprising:
a plastic layer and a first coating layer disposed on an upper surface of the plastic layer, wherein an edge of the cover window include:
a vertical side part perpendicular to the upper surface of the plastic layer; and
a first inclination part connected to the vertical part and inclined with respect to the vertical side part, wherein the vertical side part and the first inclination part include a mechanical processing trace, and wherein an edge of the first coating layer adjacent to the first inclination part includes a laser processing trace,
wherein the edge of the cover window further includes: a first groove adjacent to the first inclination part and positioned at an upper surface of the cover window, and the first groove includes the laser processing trace.

8. The cover window of claim 7, wherein a depth of the first groove is larger than or equal to a thickness of the first coating layer.

9. The cover window of claim 7, further comprising a second coating layer disposed on a lower surface of the plastic layer, wherein the edge of the cover window includes: a second groove positioned at the lower surface of the cover window, and the second groove includes the laser processing trace and is substantially symmetrical to the first groove.

10. A cover window, comprising
a plastic layer; and a first coating layer disposed on an upper surface of the plastic layer, wherein an edge of the cover window includes:
a vertical side part perpendicular to the upper surface of the plastic layer;
a first inclination part connected to the vertical side part;
a first horizontal part connected to the first inclination part, wherein the first horizontal part is substantially parallel with the upper surface of the plastic layer; and
a second inclination part connected to the first horizontal part and an edge of the first coating layer, wherein the second inclination part forms a first substantially continuous inclined edge with the edge of the first coating layer, and wherein the first substantially continuous inclined edge comprises a laser processing trace.

11. The cover window of claim 10, wherein the edge of the cover window further includes:
a second coating layer disposed on a lower surface of the plastic layer;
a third inclination part connected to the vertical side part;
a second horizontal part connected to the third inclination part, wherein the second horizontal part is substantially parallel with the lower surface of the plastic layer; and
a fourth inclination part connected to the second horizontal part and an edge of the second coating layer, wherein the fourth inclination part forms a second substantially continuous inclined edge with the edge of the second coating layer, and wherein the second substantially continuous inclined edge comprises a laser processing trace.

12. The cover window of claim 11, wherein the first and second coating layers are rigid layers.

* * * * *